May 1, 1962 H. W. LORD 3,032,682
THREE-PHASE SATURABLE REACTOR TYPE BALLAST
Filed Oct. 22, 1959 2 Sheets-Sheet 1

Inventor:
Harold W. Lord,
by Karl A. Ohralik
His Attorney.

Inventor:
Harold W. Lord,
by Karl A. Ohralik
His Attorney.

United States Patent Office 3,032,682
Patented May 1, 1962

3,032,682
THREE-PHASE SATURABLE REACTOR
TYPE BALLAST
Harold W. Lord, Schenectady, N.Y., assignor to General Electric Company, a corporation of New York
Filed Oct. 22, 1959, Ser. No. 848,074
9 Claims. (Cl. 315—144)

This invention relates to a three-phase saturable reactor type ballast system for facilitating control of current through electrical discharge type lamps.

In operating electrical gaseous discharge type lamps such as those commonly called fluorescent lamps, it is necessary after initiating an arc discharge therein, to limit the current intensity as supplied by the usual high power source and thus to limit the power dissipation in the lamp since electrical gaseous discharges exhibit very low and negative resistance characteristics. Without provision for current limitation, the current reaches values high enough to destroy the lamp. Such current, which is usually of the conventional alternating type, may be effectively limited by circuit elements interposed in the lamp supply line and having appropriate values of impedance at the frequency of the alternating current. By proper electrical construction and design, these ballasts may provide acceptable operation of the lamp in terms of power factor and lamp life. In certain new types of fluorescent lamps, however, portions of the lamp wall are very close to the discharge path and, in general, the volume and cross-sectional distances within the lamp are reduced. As a result, the lamps exhibit a more negative resistance characteristic which imposes more serious ballasting requirements. In addition, the small volume and spaces tend to promote rapid clean-up of the ionized gas, a longer dark period and a higher re-ignition potential. The end result of this for a given ballast is a lower power factor of the lamp load. Accordingly, discharge lamps of this type have imposed additional requirements which have rendered many ballast circuits ineffective to produce acceptable lamp power factor, lamp life and efficiency.

It is known to facilitate electrical discharge lamp current control by interposing the alternating current winding of a saturable reactor in series with lamp units of a lighting system. According to prior arrangements for achieving this result, however, the voltage and current wave shapes are such that the apparent power factor of the lamp is undesirably low. Thus, even though the current and voltage waves may be predominantly in phase with each other or out of phase by only small angles, the apparent power factor which is the ratio of watts of power dissipated in the lamp to the product of volts of potential across the lamp times the amperes of current through it, is low. This result may occur by reason of the fact that either or both of the waves contain harmonics not appearing in the other wave. For example, a rectangular wave of potential and a sinusoidal wave of current in phase with each other fail to produce 100 percent power factor since harmonics of potential appearing in the rectangular wave have no currents in phase therewith. Since such prior current limiting reactors produce current and potential waves that are not of an ideal rectangular wave shape nor of the same shape, lamps operating on these prior current-limiting reactors have apparent power factors that can be considerably improved.

It is accordingly an object of my invention to facilitate improved operation and performance of electrical discharge lamps particularly of the high output type by improving the lamp current and voltage wave shapes to substantially rectangular form in a system utilizing such lamps, with the use of saturable reactor means.

It is another object of my invention to facilitate improved discharge lamp power factor and efficiency with the use of relatively small inductive reactors for limiting flow of harmonic currents in the control winding circuit.

In accordance with my invention, the foregoing objects are achieved in a three-phase lamp system by providing in each phase, a saturable core reactor with an alternating current branch and a direct current control branch and in which either one of the branches comprises a pair of windings which are connected in serially opposing sense and are coupled magnetically to the other branch. The lamp in any case is serially connected in the alternating current branch. In utilizing a pair of alternating current windings and a pair of control windings in each reactor, the windings of one pair are connected in either an additive or a subtractive manner with respect to each other and the windings of the other pair are connected with respect to each other in a sense opposite to the sense of the first pair and a lamp is serially connected with the alternating current windings.

In accordance with a feature of my invention, provision is made for controlling the magnitude of direct current in the control branch to control the ampere turns of magnetomotive force producing saturation of the reactor core. Thus, the magnitude of current in the alternating current windings that is necessary to produce an equal number of ampere turns to counter the ampere turns of the control winding and desaturate the cores is also controllable and the result of this is to determine the wave shape of the current supplied to the lamp. Predominant harmonics engendered in the control coils are suppressed and a substantially rectangular current wave in the gate windings is produced whereby a substantially rectangular current wave is passed through the lamp, producing highest lamp power factors.

While the specification concludes with claims particularly pointing out and distinctly claiming the subject matter which I regard as my invention, the invention will be better understood from the following description taken in connection with the accompanying drawing in which:

Figure 1:
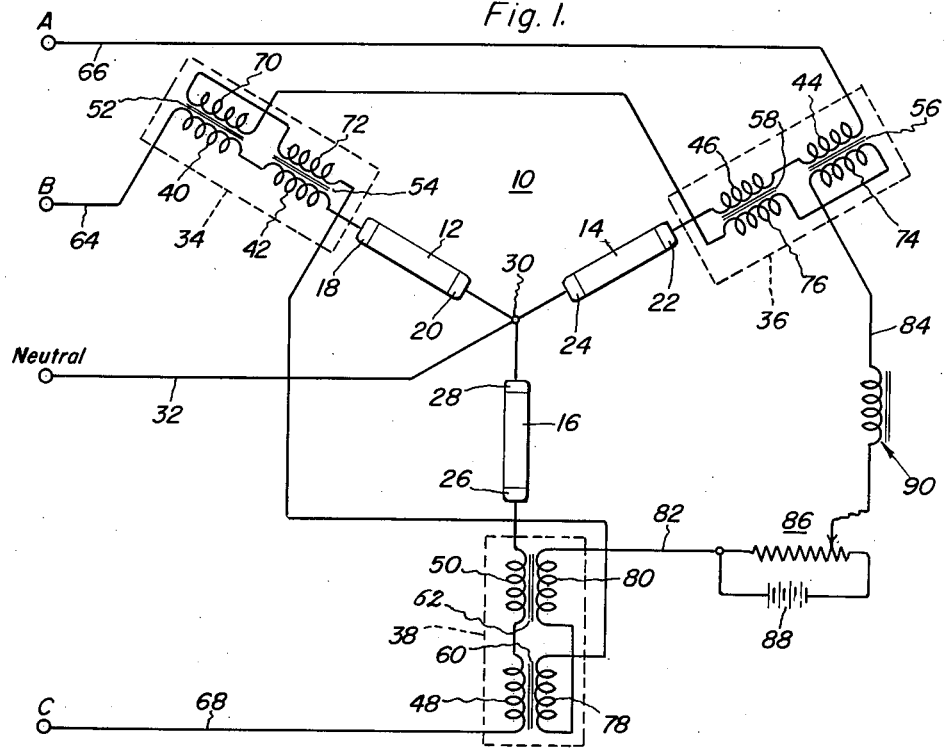
FIGURE 1 illustrates schematically the manner of applying my invention to a three-phase Y connected system.
Figure 2:
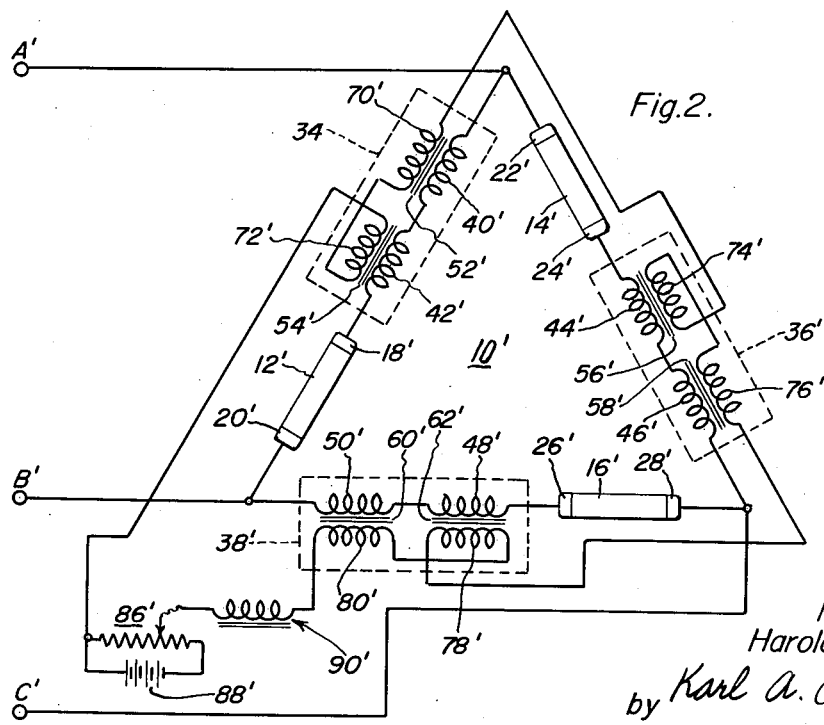
FIGURE 2 illustrates schematically the manner of applying my invention to a three-phase delta connected system.
Figure 3:
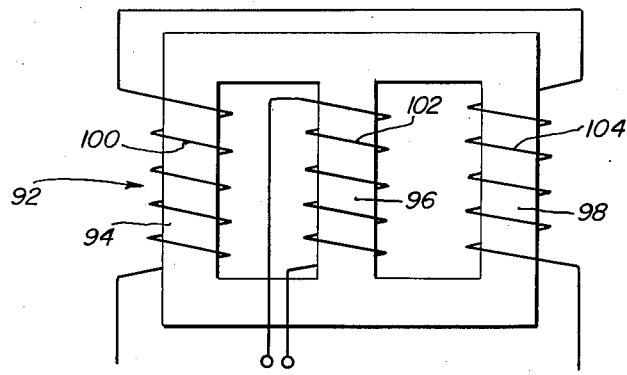
Figure 4:
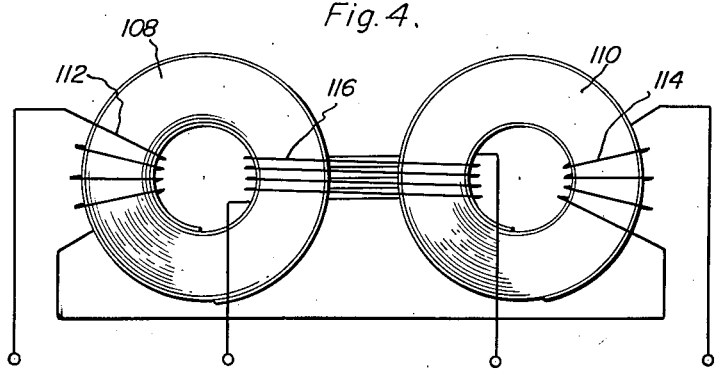
Figure 5:
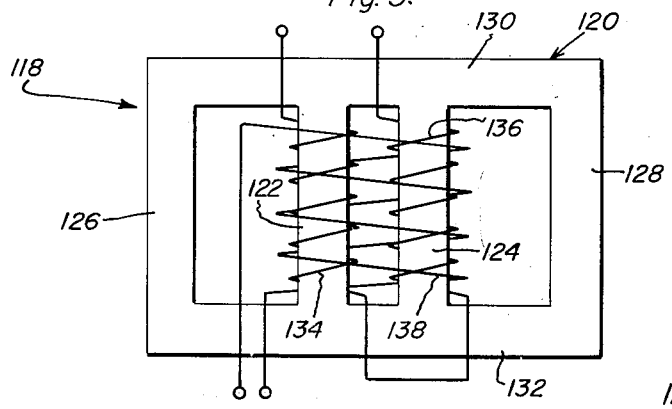

FIGURES 3 and 4 illustrate schematically modified embodiments of saturable reactors utilizable in the systems of FIGURES 1 and 2; and FIGURE 5 illustrates schematically another modified embodiment of saturable reactor utilizable in the systems of FIGURES 1 and 2.

Referring now to the drawing, 10 represents in entirety a system incorporating my invention and including three electrical discharge type lamps 12, 14 and 16, of a tubular type having respective pairs of end terminals 18 and 20 on lamp 12, 22 and 24 on lamp 14 and 26 and 28 on lamp 16. Terminals 20, 24 and 28 are joined together at a common point 30 to which a neutral line connection 32 of a 4 wire, 3 phase system may be connected.

In accordance with my invention three saturable core reactors 34, 36 and 38 are provided having respective pairs of serially connected alternating current or "gate" windings each of which may be a single winding as shown in detail in FIGURES 3, 4 and 5 but which for purposes of clarity are shown in FIGURE 1 as bi-partite windings 40 and 42, 44 and 46 and 48 and 50. These pairs of windings are wound on respective cores 52, 54, 56, 58, 60 and 62 and are connected in series with respective lamps 12, 14 and 16. The ends of windings 40, 44 and 48 remote from the other windings of the pairs with which they are serially connected are connected to respective lines 64, 66 and 68 of the 4 wire, 3 phase power system.

Each of the gate windings is coupled to a control winding wound on the same core as the gate winding. Thus, control windings 70 and 72 are coupled to the respective gate windings 40 and 42 and are wound on cores 52 and 54, windings 74 and 76 are coupled to respective gate windings 44 and 46 and are wound on cores 56 and 58 and windings 78 and 80 are coupled to respective gate windings 48 and 50 and are wound on cores 60 and 62.

Further, in accordance with a feature of my invention, the control windings of each saturable core reactor are connected in series opposition with each other and each pair is connected in series with the other pairs of control windings which are connected in series opposition with each other. The free ends of the serial connections so made terminate in lines 82 and 84 to which may be applied a controllable direct potential from a potentiometer 86 connected across a direct potential source 88. The current established by this connection is applicable for suitably saturating the cores as found desirable.

A steady direct current of a predetermined value is selected by potentiometer 86 and passed through the control windings to produce a predetermined number of ampere-turns of magnetomotive force producing saturation in the absence of the current in the gate windings. The number of ampere turns of magnetomotive force producing the saturation flux greatly exceed the number required to produce saturation. Thus, as the alternating potential is applied to each phase branch of the three-phase lamp system, a current flows in the respective gate windings therein to add to and increase the number of ampere-turns of magnetomotive force producing the saturation flux of one core of the reactor in that branch and to subtract from and decrease the number of ampere-turns of magnetomotive force producing flux in the other core of the reactor in that branch to desaturate this latter core. The result of these effects is to flatten the alternating current at values thereof in excess of that required to counter the magnetomotive force of the control windings and produce a generally rectangular current wave when properly controlled. This action has the effect of inducing fundamental and harmonic potentials in the control coils. The series, subtracting connection of the control coils in each branch with respect to the gate coils in the same branch has the effect of canceling out all odd harmonic potentials in the resultant potential of the two control coils because in such an opposed connection, the odd harmonics in the separate coils are equal in magnitude and exactly opposite in phase. But this connection has the effect of producing a resultant potential by adding even harmonic potentials induced in the two control coils since the even harmonic potentials appearing in the control coils are in phase with each other. Thus, the resultant potential across the terminals of a pair of serially connected control coils in one phase is one consisting primarily of a second harmonic, a significant percentage of fourth harmonic and lesser percentages of higher order even harmonics. However, in accordance with a feature of my invention, since the instantaneous sum of potentials in a three phase system equal zero, the series interconnection of the control coils of the three phases is effective to cancel out the second and fourth harmonic potentials induced in the three control winding pairs leaving the sixth harmonic and certain higher harmonic potentials. These latter harmonics are of small magnitude and of minor adverse effect.

With the suppression of harmonic potentials induced in the control circuit windings, the current wave in the alternating current windings becomes nearly rectangular with a consequent improvement in lamp power factor and advantages resulting therefrom. In systems operated in accordance with my invention, performance at a lamp power factor of substantially 98.3 percent can be achieved without provision for external suppression of sixth harmonic current flow in the control windings. By the added provision of an inductor 90, in series connection with the direct current control winding which may be relatively small in terms of the ratio of volt-ampere rating to power delivered to the load, lamp power factors of substantially 99.8 percent can be achieved. As an alternative, the inductance of the control windings may suffice for decreasing the effect of sixth harmonic current flow to acceptable levels without the use of inductor 90.

According to another embodiment of my invention shown in FIGURE 2 of the drawings the elements of the system 10 shown in FIGURE 1 may be interconnected in a delta rather than Y circuit arrangement. Accordingly, similar elements are designated by the same numbers primed.

In the circuit of FIGURE 2, the same result is achieved as in the circuit of FIGURE 1, it being understood, however, that the three phase supply potential is reduced by an appropriate factor.

For the purpose of facilitating the explanation of my invention, the reactors 34, 36 and 38 are shown as each comprising a pair of alternating current windings connected in series additive relation with respect to each other and in series with the respective discharge lamps and a pair of control windings connected in series opposing relation with respect to each other. In accordance with my invention, however, the alternating windings of each core may equally be in series opposing relation with respect to each other and in this case the control windings would be in series additive relation with respect to each other.

Further in accordance with my invention, the reactors 34, 36 and 38 may have various constructions. For example, each may be as shown in FIGURES 3 or 4 of the drawing. In FIGURE 3 the reactor represented generally at 92 comprises a saturable core having three legs, 94, 96 and 98 interconnected at their ends and windings 100, 102 and 104 about the respective cores. Windings 100 and 104 are serially connected in an opposing sense and may be the alternating current windings or the direct current windings in the circuit of FIGURES 1 and 2. Winding 102 is coupled to each of windings 100 and 104 and may be a single direct current control winding in the event windings 100 and 104 are alternating current windings or may be an alternating current winding in the event that the windings 100 and 104 are direct current windings.

As shown in FIGURE 4 a reactor 106 may comprise a pair of toroidal saturable cores 108 and 110 comprising a closely coiled strip of magnetizable material, with a first winding 112 on core 108 and a winding 114 on core 110. A winding 116 is provided, enclosing both cores 108 and 110 in its loops and the windings 112 and 114 are connected in series opposition with respect to each other in relation to potentials induced therein by currents in winding 116.

In providing the reactors 34, 36 and 38 shown in FIGURE 1 as shown in FIGURE 4, windings 112 and 114 may be the alternating current windings with winding 116 being the direct current control winding or windings 112 and 114 may be the direct current control windings and the winding 116 in such cases is the alternating current winding. The reactors of FIGURES 3 and 4 produce the same effect in the circuits of either FIGURES 1 or 2, it being only necessary to intercouple or interconnect the windings of a reactor in such a manner as to produce cancellation of predominant harmonics in the control winding circuit.

In accordance with another embodiment of my invention as shown in FIGURE 5 of the drawings, a saturable reactor represented generally at 118 includes a core 120 having a pair of centrally disposed legs 122 and 124 and a pair of outer legs 126 and 128 of magnetizable material. The four legs are connected in parallel geometric arrangement by a pair of end members 130 and 132 interconnecting the several legs at each end.

Alternating current windings 134 and 136 being serially connected, are disposed on respective cores 122 and 124 to tend to produce a magnetic flux in opposite directions in the respective cores at any instant of time in response to energization thereof. Such a flux circulates predominantly in these legs and the portions of end members 130 and 132 therebetween. A direct current winding 138 is wound around legs 122 and 124 collectively, to tend to produce a magnetic flux in the same direction in each of the legs in response to energization of this winding.

The saturable core reactor 118 is most efficient since the alternating current flux path includes only the two legs and portions of end members 130 and 132 therebetween and is preferable to the other embodiments of saturable cores disclosed in certain forms of my invention.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A three phase ballast system comprising a pair of alternating current windings and a load element serially connected in each branch of said three phase system, a control winding magnetically coupled to each alternating current winding through a saturable core, the control windings coupled to the alternating current windings of each phase being connected in series opposition with each other, the three pairs of control windings being serially connected for even harmonic suppression, and means for applying a direct current to said control windings to saturate each said saturable core in the absence of oppositely phased alternating current in the corresponding alternating current winding.

2. A three phase ballast system comprising a pair of alternating current windings and a load element serially connected in each branch of said three phase system, a control winding magnetically coupled to each alternating current winding through a saturable core, the control windings coupled to the alternating current windings of each phase being connected in series opposition, the three pairs of control windings being serially connected and means for applying a direct potential to said serially connected control windings through an inductive reactance.

3. A three phase electrical discharge lamp ballast system comprising a pair of alternating current windings serially connected with a lamp in each branch of said three phase system, a control winding magnetically coupled to each alternating current winding through a saturable core, the control windings coupled to the alternating current windings of each phase being connected in series subtractive polarity with each other, the three pairs of control windings being serially connected to cancel even harmonics induced from said alternating current windings, and means for passing a steady direct current through said control windings to saturate each of said cores.

4. A three phase ballast system comprising a reactor having a first winding circuit including a winding wound about a saturable core in each phase of the system, a further winding circuit including a pair of windings wound on each of said cores and being connected in series opposing relation with respect to potentials inducible therein by the currents in the first winding on the core, a discharge lamp connected in series with one of the winding circuits of each phase, the other winding circuit being connected in series with each other and with a source of controllable direct current.

5. A three phase ballast system comprising a reactor in each phase of the system and having a first winding circuit including a pair of windings serially connected in a predetermined sense and a second winding circuit including a pair of windings serially connected in a sense opposite to said predetermined sense, a discharge lamp in the first winding circuit of each reactor and means for establishing the same controllable direct current through the windings of each of the second winding circuits of each reactor to substantially cancel second harmonic currents induced from said first winding circuit.

6. A three phase ballast system comprising a reactor in each phase of the system, each reactor having a first and a second magnetizable leg in a closed, magnetic circuit, first and second windings connected in series and being disposed about respective first and second legs, said windings being effective to produce a magnetic flux in series aiding relationship in said magnetic circuit, a third winding disposed about said first and second legs collectively and further magnetic circuit means forming a closed, magnetic circuit respectively with said first and second legs, a load element connected in series with each of said first and second windings in said three phase system and means for energizing said third winding of each reactor with direct current in a serial connection including said third windings to cancel second harmonic currents induced therein.

7. In a three-phase ballast arrangement for providing a square wave current characteristic for operating fluorescent lamps, input terminals for receiving three-phase power, output terminals for connection to a fluorescent lighting circuit, three saturable reactors each having alternating current windings interposed between a pair of corresponding input and output terimnals and each having a saturating flux providing control winding coupled to its corresponding alternating current winding in a reversing polarity relation so that no fundamental and odd harmonic frequencies are excited in said control winding, and a delta connection comprising the control windings of said reactors in a series circuit for cancelling flow of second harmonic currents therein.

8. In a three-phase ballast arrangement for operating fluorescent lamps, three saturable core reactors means having alternating current windings for interposition between respective lamp circuits and three-phase power circuitry, D.-C. control winding means magnetically associated with said alternating current windings for saturating said reactor means in the absence of a predetermined peak magnitude of alternating current in said alternating current windings while being decoupled from the alternating current windings at the funadmental frequency of the three-phase power, said control winding means providing a serial circuit at the second harmonic frequency of said three-phase power for cancelling said second harmonic frequency, and means for applying a direct current to said control winding means.

9. In a three-phase ballast arrangement, input terminals for receiving three-phase power, a three-phase saturable reactor arrangement including alternating current windings interposed between said input terminals and a load, saturating means for providing a saturating flux to lessen the impedance of respective said alternating current windings in the absence of a predetermined value of alternating current therein including means for mutually cancelling second harmonics of said three-phase power so that the current flowing in said alternating current windings has a substantially rectangular characteristic.

References Cited in the file of this patent

UNITED STATES PATENTS

| | | |
|---|---|---|
| 2,008,494 | Elder et al. | July 16, 1935 |
| 2,044,006 | Locke | June 16, 1936 |
| 2,458,277 | Lark et al. | Jan. 4, 1949 |
| 2,683,798 | Craig | July 13, 1954 |
| 2,770,738 | Vance | Nov. 13, 1956 |

FOREIGN PATENTS

| | | |
|---|---|---|
| 611,810 | Great Britain | Nov. 4, 1948 |